April 25, 1950 L. A. MAJNERI 2,505,195
HYDRAULIC VALVE
Filed Dec. 18, 1944 2 Sheets-Sheet 1
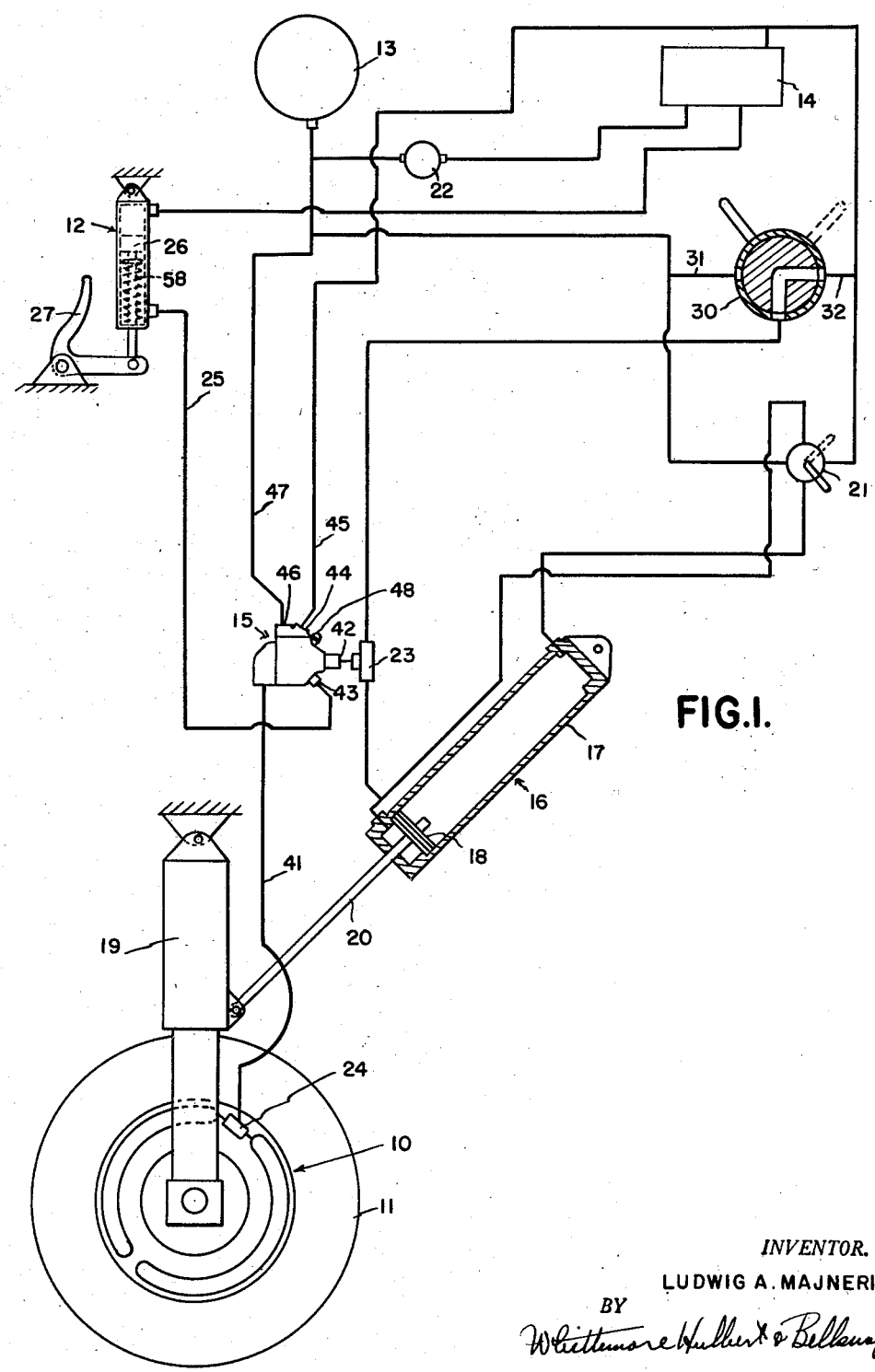
FIG.I.
INVENTOR.
LUDWIG A. MAJNERI
BY
*Whittemore Hulbert & Belknap*
ATTORNEYS April 25, 1950 L. A. MAJNERI 2,505,195
HYDRAULIC VALVE
Filed Dec. 18, 1944 2 Sheets-Sheet 2

*INVENTOR.*
LUDWIG A. MAJNERI
BY
Whittemore Hulbert & Belknap
ATTORNEYS

Patented Apr. 25, 1950

2,505,195

UNITED STATES PATENT OFFICE 2,505,195

HYDRAULIC VALVE

Ludwig A. Majneri, Grosse Pointe, Mich., assignor to The Warner Aircraft Corporation, Detroit, Mich., a corporation of Michigan Application December 18, 1944, Serial No. 568,747

6 Claims. (Cl. 137—153)

This invention relates generally to aircraft embodying a hydraulic installation for applying the brakes and for retracting the landing gear. More particularly the invention concerns itself with an improved power valve for use in the hydraulic system for applying the brakes.

It is customary in numerous different types of aircraft to retract the landing gear including the ground engaging wheels as soon as the aircraft is in flight. Inasmuch as it is usually necessary to run the aircraft along the ground at a relatively high speed before attempting to lift the aircraft off the ground, it follows that the ground engaging wheels rotate freely for some time during initial flight of the aircraft. As soon as the ground engaging wheels leave the ground, a gyratory action is set up and a certain amount of vibration is produced which, in large aircraft, reaches objectionable proportions.

The above objection is overcome by providing means responsive to retracting the ground engaging wheels for applying the brakes to thereby stop rotation of the ground engaging wheels. It is an object of this invention to provide a power valve connected to the hydraulic braking system for applying the brakes in the usual way and for also applying the brakes in the response to the retracting movement of the landing gear.

Another feature of this invention is to provide a power valve capable of being operated by the usual manually operable pressure producing device to apply the brakes and also capable of being operated to apply the brakes by pressure produced either mechanically or hydraulically from a second source.

The foregoing as well as other objects will be made more apparent as this description proceeds, especially when considered in connection with the accompanying drawings wherein—

Figure 1 is a diagrammatic view illustrating a part of a hydraulic installation embodying a valve constructed in accordance with this invention;

Figure 2 is a longitudinal sectional view through the power valve shown in Figure 1;

Figure 3 is a diagrammatic view of a slightly modified form of the invention; and Figure 4 is a longitudinal sectional view through the valve shown in Figure 3.

The valves shown in Figures 2 and 4 of the drawings are illustrated for the purpose of this description as used in connection with hydraulic braking systems for aircraft embodying a retractable landing gear. It will be understood as this description proceeds, however, that the valves are not limited to this particular application.

With the above in view, reference is made to Figure 1, wherein it will be noted that a part of a hydraulic braking system of the general type used on aircraft is shown. Briefly the system illustrated comprises a brake 10 for the ground engaging wheel 11, a manually operable pressure producing device 12, an accumulator 13, a reservoir 14 and a power valve 15.

Also in Figure 1 of the drawings is a hydraulically operated landing gear retracting mechanism 16. The retracting mechanism 16 comprises a cylinder 17 and a piston 18 supported for sliding movement in the cylinder 17. The piston 18 is connected to the mounting 19 for the ground engaging wheel 11 by means of a rod 20 and the mounting 19 is pivoted at the upper end to enable retracting or swinging the ground engaging wheel 11 upwardly in response to corresponding movement of the piston 18 in the cylinder 17. Each end of the cylinder 17 is adapted to be selectively connected to the reservoir 14 and to the accumulator 13 by a manually operable valve 21. The accumulator 13 is supplied with hydraulic braking fluid under pressure by a pump 22 having the intake side communicating with the reservoir and having the discharge side communicating with the accumulator.

It follows from the above that when the valve 21 is in the position shown in Figure 1, the lower end of the cylinder 17 is connected to the accumulator and the upper end of the cylinder is connected to the reservoir 14. As a result the piston 18 is moved upwardly in the cylinder 17 and the ground engaging wheel is retracted. Of course, movement of the valve 21 to its other position of adjustment reverses the above operation to swing the ground engaging wheel to its operative position.

The lower end of the cylinder is also connected to the power valve 15 through a shuttle valve 23 so that as the ground engaging wheel 11 is retracted, fluid under pressure from the accumulater passes through the shuttle valve 23 into the power valve 15. As will be presently described, fluid under pressure from the accumulator entering the power valve 15 operates the latter to connect the hydraulic brake actuator 24 to the accumulator to apply the brake. It will also be noted from Figure 1 that the power valve 15 may be operated by the device 12 to connect the brake actuator 24 to the accumulator 13. In this connection it will be noted that the device 12 is in the form of a conventional master cylinder having the lower end connected directly to the power valve by means of a conduit 25 and having a piston 26 reciprocably mounted in the cylinder. The piston 26 is moved downwardly in the master cylinder to supply fluid under pressure to the power valve 15 by a manually operable control pedal 27. Thus it will be noted that the power valve may be operated to apply the brake 10 by either the fluid from the high pressure accumulator 13 or by the relatively low pressure fluid from the master cylinder 12.

It will further be noted from Figure 1 that provision is made for applying the brake 10 for parking purposes. This is accomplished by connecting the upper end of the shuttle valve 23 to a three-way valve 30 having passages 31 and 32 respectively communicating with the accumulator 13 and the reservoir 14. In the position of the valve 30 shown in Figure 1, the upper end of the shuttle valve 23 is connected to the reservoir and accordingly may be operated by the hydraulic wheel tracting mechanism to connect the accumulator to the power valve 15. On the other hand, when it is desired to park the brake 10, the valve 30 is operated to connect the port 31 or the accumulator 13 with the upper end of the shuttle valve 23. It will, of course, be understood that when the valve 30 is operated to park the brake, the valve 21 is in a position to connect the lower end of the cylinder 17 and the lower end of the shuttle valve to the reservoir so that the shuttle valve is moved downwardly to connect the accumulator 13 through the valve 30 to the brake applying valve 15. As a result, the valve 15 is operated to supply fluid under pressure from the accumulator to the brake actuator 24 and the brake 10 is applied.

The power valve 15 for accomplishing the results briefly noted above is shown in detail in Figure 2 of the drawings. This valve comprises a body 33 having a bore 34 through one end and having a cap 35 for closing the latter end of the bore. A sleeve 36 is secured in the bore 34 and provides a cylindrical valve chamber 37. The valve chamber has a reduced portion 38 adjacent the cap 35 and is provided with an enlarged portion 39 at the opposite end of the bore. The reduced portion 38 registers with an outlet port 40 in the cap and this outlet port 40 communicates with the brake actuator by means of the conduit 41 in Figure 1 of the drawings. The enlarged portion 39 of the chamber 37 registers with a pair of inlet ports 42 and 43. The inlet port 42 communicates with the shuttle valve 23 intermediate the ends thereof and the inlet port 43 communicates with the master cylinder 12 through the medium of the conduit 25.

An outlet port 44 is formed in the body 33 between the outlet port 40 and the inlet port 42. The outlet port 44 connects the enlarged portion 39 of the chamber 37 to the reservoir 14 through the medium of a conduit 45, shown in Figure 1 of the drawings. An inlet port 46 is formed in the valve body 33 between the ports 40 and 44. This port connects the reduced portion 38 of the chamber 37 to the accumulator 13 through the medium of a conduit 47 shown in Figure 1 of the drawings. Provision is also made for filling and bleeding the system by providing a suitable bleeder valve 48. It will also be noted that suitable O-ring seals designated generally by the reference character 49 are provided wherever it is necessary to seal the construction against leakage.

A valve member 50 is supported in the chamber 37 for movement in opposite directions. The valve member 50 has a reduced portion 51 which is lapped in the reduced portion 38 of the chamber and is provided with an enlarged head portion 52, which slideably engages the inner wall of the enlarged portion 39 of the chamber. A suitable O-ring seal 53 is provided on the enlarged portion 52 of the valve to prevent the escape of fluid under pressure around this portion of the valve. The reduced portion 51 of the valve is formed with a chamber 54 open at the end adjacent the cap 35 and having radial ports 55 at the opposite end. The radial ports 55 are adapted to alternatively register with the inlet port 46 and the outlet port 44 upon movement of the valve member in opposite directions.

The valve member 50 is normally urged to the position shown in Figure 2, by a coil spring 56 surrounding the valve within the enlarged portion 39 of the chamber with opposite ends thereof respectively abutting the head portion 52 on the valve and the radial shoulder 57 on the sleeve 36. In this position of the valve 50, the ports 55 connect the brake actuator 24 or outlet port 40 to the reservoir 14 through the outlet port 44.

As indicated above the valve 50 is moved against the action of the spring 56 to register the ports 55 with the intake port 46 to supply fluid under relatively high pressure from the accumulator to the brake actuator by manipulation of either the landing gear retracting valve 21, the parking valve 30 or by the manipulation of the master cylinder 12. Assuming that it is desired to apply the brake 10 in the usual manner, the control pedal 27 is actuated to move the piston 26 downwardly. As the piston 26 in the master cylinder moves downwardly against the action of the spring 58, fluid under pressure enters the inlet port 43 and acts on the enlarged head 52 of the valve 50 to move the latter sufficiently to register the ports 55 with the inlet port 46. As a result fluid from the accumulator 13 is permitted to flow through the valve 15 to the hydraulic brake actuator 24 to apply the brake 10. Although it will be noted that the relatively high pressure from the accumulator acts on the reduced end 51 of the valve 50 tending to move the latter against the pressure entering the enlarged portion 39 of the chamber through the inlet port 43, nevertheless, it will be noted that the area differential between the reduced portion 51 of the valve and the enlarged head 50 thereof is such as to enable movement of the valve member to its brake applying position by the application of a relatively light pressure on the pedal 27.

Inasmuch as the accumulator pressure is frequently somewhat higher than required to apply the brake and may exceed the pressure for which the brake is designed, it is desirable to maintain this pressure below a predetermined maximum value. This is accomplished by the power valve because as soon as the pressure in the chamber 54 rises above the predetermined value, the valve member 50 is moved toward the inlet port 42 to close the inlet port 46. In the event this pressure continues to rise, the valve 50 is moved sufficiently to register the ports 55 with the reservoir through the port 44 to bleed fluid under pressure back to the reservoir. After sufficient fluid under pressure escapes to the reservoir, the valve 50 is again moved in the opposite direction to close the outlet port 44 and to open the inlet port 46 in the event the pressure falls below the desired value. When the pedal 27 is released, the spring 58 moves the piston 26 upwardly in the master cylinder to return the fluid in the conduit 25 to the master cylinder. The spring 56 then operates to move the valve 50 to the position shown in Figure 2, wherein the actuator 24 is connected to the reservoir 14 through the outlet port 44.

Manipulation of either the valve 21 or the valve 30 to their operative positions connects the inlet port 42 of the power valve to the high pressure accumulator. Thus it will be noted that the same pressure exists in the ports 42 and 46. This condition is unsatisfactory for proper operation of the valve 50, especially in the present instance where the head 52 on the valve is of considerably greater area than the end portion of the valve subjected to the high pressure available at the port 46. In order to solve this problem, a plunger 60 is supported for sliding movement in the valve body 33 between the port 42 and the enlarged head 52 on the valve member 50. The plunger 60 is provided with an enlarged portion 61 for abutting the head 52 on the valve member 50 and the reduced portion 62 of the plunger has a sliding engagement with the valve body 33. It will be noted from Figure 2 that the end of the reduced portion is exposed to the accumulator pressure at the port 42 and has an area substantially less than the area of the reduced end 51 of the valve member 50, which is exposed to the accumulator pressure entering the inlet port 46. This arrangement of differential areas enables proper operation of the valve member 50 when the port 42 is connected to the accumulator 13 by either of the valves 21 and 30.

The embodiment of the invention shown in Figures 3 and 4 differs principally from the first described form of the invention in that the power valve 15 is mechanically operated by the landing gear retracting mechanism as the ground engaging wheel 11 is raised. Upon reference to Figure 3 it will be noted that an arm 63 is supported for pivotal movement at its upper end on a pin 64. One side of the arm is engageable with a cam 65 formed on the upper end of the wheel mounting 19 and the other side of the arm is engageable with a plunger 66.

As shown in Figure 4 the plunger 66 is supported for sliding movement in axial alignment with the valve member 50 in a guide 67 which is secured to the valve body 33 in registration with the inlet port 42. A second plunger 68 is slideably supported in the valve body 33 between the valve member 50 and the plunger 66. The plunger 68 has an enlarged end 69 which abuts the head 52 on the valve member 50 and is yieldably connected at the opposite end to the plunger 66 by a coil spring 70.

The above arrangement is such that as the ground engaging wheel 11 is swung upwardly by the retracting device 16, the cam 65 swings the arm 63 in a clockwise direction and forces the plunger 66 inwardly with respect to the valve 15. The inward movement of the plunger 66 is transferred through the spring 70 to the plunger 68 and the latter moves the valve member 50 against the action of the spring 56 to a position wherein the ports 55 connect the inlet port 46 to the outlet port 40. In this latter position of the valve member, the accumulator 13 is connected to the brake actuator 24 to apply the brake 10. The purpose of the spring 70 is to enable reciprocation of the valve member 50 in the valve chamber in response to variations in pressure at the reduced end of the valve member to alternatively connect the brake actuator to the accumulator and reservoir. Thus, even in this modification, the power valve 15 operates to limit or regulate the pressure admitted to the brake actuator.

What I claim as my invention is:

1. A power valve assembly for hydraulic operating mechanisms comprising a body having a chamber provided with a reduced portion at one end and with an enlarged portion at the opposite end, an outlet port in the body for communicating with the reduced end of the chamber, an inlet port in the body communicating with the reduced end of the chamber, a second outlet port in the body, means in said chamber for alternatively connecting the first outlet port to the inlet port and to the second outlet port, said means including a valve member having a reduced portion slidably mounted in the reduced portion of the chamber and having an enlarged portion slidably mounted in the enlarged portion of the chamber, a second inlet port in the body communicating with the enlarged portion of the chamber, and means responsive to fluid under pressure at the second inlet port for moving the valve member to connect the first outlet port to the first inlet port including a plunger positioned between the second inlet port and enlarged end of the valve member with one end engaging the enlarged end of the valve member, the opposite end of said plunger being exposed to hydraulic pressure at the second inlet port and having an area less than the area of the reduced end of the valve member.

2. A power valve assembly for hydraulic operating mechanisms comprising a body having a chamber provided with a reduced portion at one end and with an enlarged portion at the opposite end, an outlet port in the body communicating with the reduced end of the chamber, an inlet port in the body communicating with the reduced end of the chamber, a second outlet port in the body, means in said chamber for alternatively connecting the first outlet port to the inlet port and to the second outlet port in response to pressure variations in the reduced end of the chamber, said means including a valve member having a reduced portion slidably mounted in the reduced portion of the chamber and having an enlarged portion slidably mounted in the enlarged portion of the chamber, a second inlet port in the body communicating with the enlarged portion of the chamber beyond the enlarged portion of the valve member to provide for moving the valve member to a position wherein the first outlet port is connected to the first inlet port, mechanical means for also moving the valve member to said latter position including a plunger slidably supported in the body and engageable with the adjacent end of the valve, a second plunger slidably supported in the body in axial alignment with the first plunger and adapted for engagement by an operating member, and a yieldable connection between the plungers.

3. A power valve assembly for hydraulic operating mechanisms comprising a body having a chamber provided with a reduced portion at one end and with an enlarged portion at the opposite end, an outlet port in the body communicating with the reduced end of the chamber, an inlet port in the body communicating with the reduced end of the chamber, a second outlet port in the body, means in said chamber for alternatively connecting the first outlet port to the inlet port and to the second outlet port, said means including a valve member having a reduced portion slidably mounted in the reduced portion of the chamber and having an enlarged portion slidably mounted in the enlarged portion of the chamber, a second inlet port in the body opposite the enlarged portion of the chamber, and means responsive to fluid under pressure at the second inlet port for moving the valve member to connect the first outlet port to the first inlet port including a plunger positioned between the second inlet port and enlarged end of the valve member with one end engaging the enlarged end of the valve member, the opposite end of the plunger being exposed to hydraulic pressure at the second inlet port and having an area less than the area of the reduced end of the valve member, and additional means for moving the valve member to connect the first outlet port to the first inlet port including a third inlet port in the body communicating with the enlarged portion of the chamber.

4. A power valve assembly for hydraulic operating mechanisms comprising a body having a chamber provided with a reduced portion at one end and with an enlarged portion at the opposite end, an outlet port in the body communicating with the reduced end of the chamber, an inlet port in the body communicating with the reduced end of the chamber, a second outlet port in the body, means in said chamber for alternatively connecting the first outlet port to the inlet port and to the second outlet port, said means including a valve member having a reduced portion slidably mounted in the reduced portion of the chamber and having an enlarged portion slidably mounted in the enlarged portion of the chamber, a second inlet port in the body communicating with one end of chamber, and means responsive to fluid under pressure at the second inlet port for moving the valve member to connect the first outlet port to the first inlet port including a plunger slidably supported in the body between the second inlet port and adjacent end of the valve member with one end engaging the latter, the opposite end of the plunger being exposed to hydraulic pressure at the second inlet port and having an area less than the area of the reduced end of the valve member.

5. A power valve assembly for hydraulic operating mechanisms comprising a body having a chamber provided with a reduced portion at one end and with an enlarged portion at the opposite end, an outlet port in the body communicating with the reduced end of the chamber, an inlet port in the body communicating with the reduced end of the chamber, a second outlet port in the body, means in said chamber for alternatively connecting the first outlet port to the inlet port and to the second outlet port, said means including a valve member having a reduced portion slidably mounted in the reduced portion of the chamber and having an enlarged portion slidably mounted in the enlarged portion of the chamber, a second inlet port in the body communicating with one end of chamber, means responsive to fluid under pressure at the second inlet port for moving the valve member to connect the first outlet port to the first inlet port including a plunger slidably supported in the body between the second inlet port and adjacent end of the valve member with one end engaging the latter, the opposite end of the plunger being exposed to hydraulic pressure at the second inlet port and having an area less than the area of the reduced end of the valve member, and additional means for moving the valve member to connect the first outlet port to the first inlet port including a third inlet port in the body.

6. A power valve assembly for hydraulic operating mechanisms comprising a body having a chamber, an outlet port in the body, a second outlet port spaced from the first outlet port, an inlet port spaced from said outlet ports, a valve member moveable in opposite directions in the chamber for alternatively connecting the first outlet port to the inlet port and to the second outlet port, a second inlet port communicating with the chamber to direct fluid under pressure against a portion of the valve member to move the latter in a direction to connect the first inlet port to the first outlet port, a third inlet port communicating with the chamber, and a plunger slidably supported in the body between the third inlet port and valve member, one end of the plunger being engageable with the valve member and the opposite end of the plunger having an area exposed to fluid under pressure at the third inlet, which area is predetermined with respect to the area of the valve member exposed to fluid under pressure at the first outlet port to obtain the desired operating pressure.

LUDWIG A. MAJNERI.

REFERENCES CITED

The following references are of record in the file of this patent:

UNITED STATES PATENTS

| Number | Name | Date |
|---|---|---|
| 738,793 | Green | Sept. 15, 1903 |
| 1,732,418 | Rainsford | Oct. 22, 1929 |
| 2,028,631 | Stevens | Jan. 21, 1936 |
| 2,045,445 | Davis | June 23, 1936 |
| 2,092,364 | Stevens | Sept. 7, 1937 |
| 2,171,569 | Johnson | Sept. 5, 1939 |
| 2,306,346 | Rockwell | Dec. 22, 1942 |